United States Patent [19]
Fujita

[11] 3,930,262
[45] Dec. 30, 1975

[54] SHUTTER SPEED CONTROL MEANS
[75] Inventor: Susumu Fujita, Hyogo, Japan
[73] Assignee: Fuji Photo Film Co., Ltd., Minami-Ashigara, Japan
[22] Filed: Apr. 18, 1974
[21] Appl. No.: 462,059

[30] Foreign Application Priority Data
Apr. 23, 1973 Japan.............................. 48-46516

[52] U.S. Cl. ............................................... 354/267
[51] Int. Cl.² ........................................... G03B 17/40
[58] Field of Search ........................... 354/241–243, 354/245, 246, 250, 253, 256, 266–267, 231

[56] References Cited
UNITED STATES PATENTS
3,479,946  11/1969  Bohm............................... 354/231 X FOREIGN PATENTS OR APPLICATIONS
4,535,740  11/1970  Japan................................... 354/256

*Primary Examiner*—Samuel S. Matthews
*Assistant Examiner*—James LaBarre
*Attorney, Agent, or Firm*—Sughrue, Rothwell, Mion, Zinn & Macpeak

[57] ABSTRACT

A shutter speed control means wherein, when a photograph is being taken, after a first curtain has moved a certain distance, a retention means, which normally engages and retains a second curtain, is moved out of engagement with the second curtain by a release lever, said release lever having a lower rounded end portion in spring attachment to the retention means, and is pivotally mounted on a pin fixedly attached to a lower portion of a setting arm. The release lever is actuated by a pin fixedly attached to the first curtain.

3 Claims, 3 Drawing Figures

U.S. Patent   Dec. 30, 1975   3,930,262
FIG. 1 PRIOR ART
FIG. 3
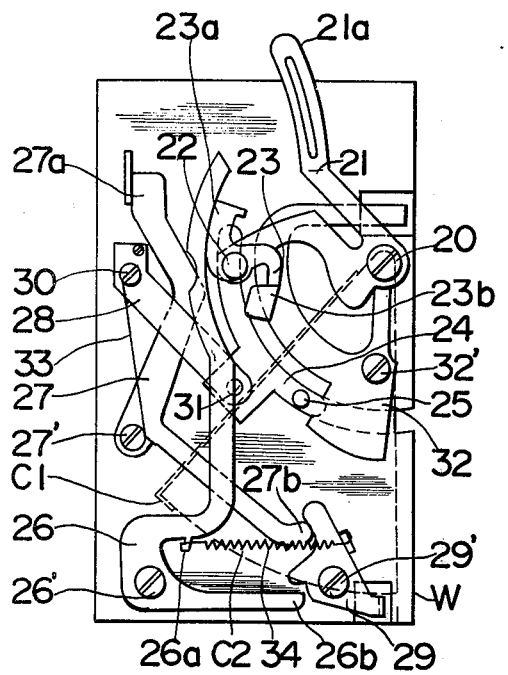
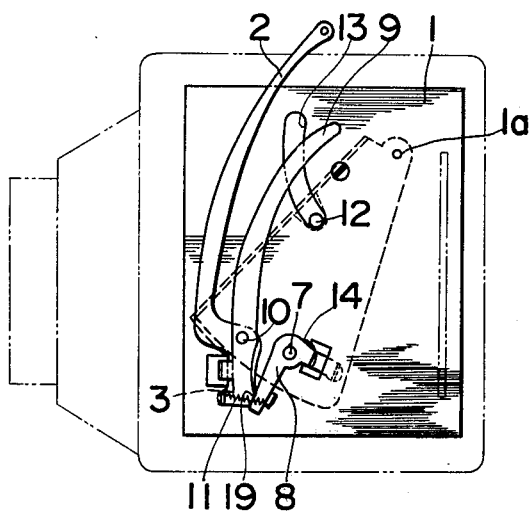
FIG. 2
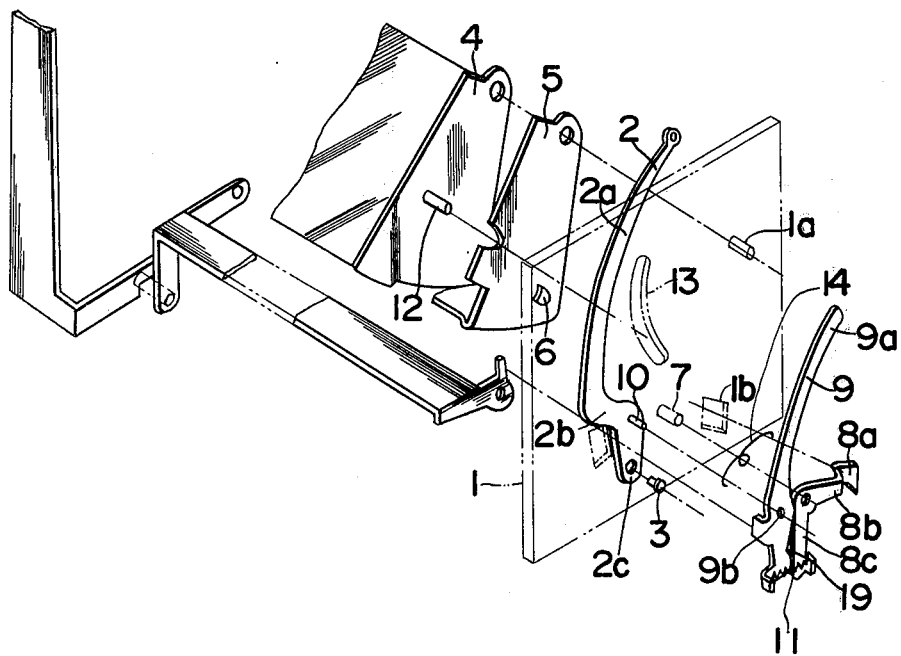

SHUTTER SPEED CONTROL MEANS

The present invention relates to photographic equipment, and more particularly to a shutter speed control means in a single lens reflex camera employing first and second pivotal mirrors.

It is known conventionally to provide a camera shutter means whereby exposure of a film is effected by light passing through a slit between a first curtain and a second curtain, which are successively moveable in front of the film, and wherein effective shutter speed may be adjusted by a control means which causes the second curtain to be moved after the first curtain has moved a greater or a smaller distance. In a typical conventional shutter speed control means, as for example shown in FIG. 1, when a shutter release button or similar means (not shown) is actuated, a second curtain C2 is prevented from moving by a retention element 29, until a first curtain C1 has moved a certain distance, both the first curtain C1 and the second curtain C2 being spring-loaded and rotatable upwards in front of a film plane by the same or separate means. The retention element 29 is pivotally mounted by a pin 29' on a shutter housing wall W in the camera, is contactable by one arm 26b of a second curtain release lever 26, and is connected to the other arm 26a of the lever 26 by a tension spring 34, which tends to pivot the retention element 29 (anticlockwise in the drawing) into a position to engage and retain the second curtain. Normally, i.e., prior to a photograph being taken, the retention element 29 is contacted by one arm 27b of a shutter actuation lever 27, which holds the retention element out of a position for engagement of the second curtain, whereby the element 29 does not hinder cocking of the first and second curtains.

The second curtain release lever 26 is pivotally mounted by a pin 26' on the wall W, forward of the retention element 29, and the arm 26a thereof extends upwards. The upper portion of the arm 26a is curved and is contacted by one arm 23a of a trigger lever 23. The trigger lever 23 is pivotally mounted on a pin 22, which is fixedly attached to one end of an adjustment lever 21, and lies over a curved groove 24 formed in the wall W. A pin 25, which is fixedly attached to the first curtain C1, extends into and through this curved groove 24, is carried upwards along the groove, when the first curtain is released, and at a certain point in this upward travel contacts another arm 23b of the trigger lever 23, and then pivots the trigger lever 23. The adjustment lever 21 is pivotally mounted by a shaft 20 on the compartment wall W, and has an upwardly extending portion 21a, which connects to an external, manually actuated means (not shown) and forward or rear movement of which causes the trigger lever 23 to be moved to a lower or higher position, while still remaining in line with the curved groove 24 and contactable by the pin 25 on the first curtain C1.

The adjustment lever 21 also contacts a lever 32, which is pivotally mounted by a pin 32' on the compartment wall, and an arm extending generally at right-angles to the wall and contacting a spring means (not shown) for effecting shutter movement. When the adjustment lever 21 is moved forward, to bring the trigger lever 23 to a lower position, the lever 32 is simultaneously rotated by the adjustment lever 21, and imparts a greater tension to the shutter spring means, thereby increasing the speed at which the shutter curtains C1, C2 are moved, when released. Contrariwise, rearward movement of the adjustment lever 21, to move the trigger lever 23 higher, also causes the lever 32 to pivot in a direction to decrease the tension imparted on the shutter spring means.

The actuation lever 27 connects by suitable means to the camera shutter release button (not shown), is pivotally mounted by a pin 27' on the wall W, and has an upwardly extending arm 27a which crosses and contacts a spring arm 28, the lever arm 27a being between the spring arm 28 and the wall W, and a spring wire 33 being provided between the actuation lever 27 and spring arm 28 so as to urge the actuation lever 27 to rotate counter-clockwise in the drawing. The spring arm 28 is fixedly attached at one end to the wall W by a screw 30, and extends downwards and rearwards, the other end thereof being adjacent to the first curtain C1 in the cocked position, and forming or being in attachment to a generally triangular catch portion 31, which holds the first curtain C1 in a cocked position, and is itself held in position by the force of the spring arm 28. When the shutter release button is actuated, the lever 27 is pivoted clockwise in the drawing against the resilient force of the spring 33, and the arm 27b thereof moves out of contact with the second curtain retention element 29, which is thereupon rotated by the spring 34 and engages and retains the second curtain C2. At the same time, the other actuation lever arm 27a moves along the spring arm 28, rides on a sloping side of the catch portion 31, and pushes the catch portion 31 and spring arm 28 sideways with respect to the wall W, whereby the catch portion 31 disengages the first curtain C1, which is therefore released and swings upwards. At a certain point in this upward movement of the first curtain C1, the pin 25 attached thereto comes into contact with the trigger lever 23. As the first curtain C1 continues to move upwards, the trigger lever 23 is pivoted by the pin 25, and simultaneously causes the release lever 26 to pivot anticlockwise, whereby the release lever arm 26b pivots the retention element 29 out of engagement with the second curtain C2, which therefore moves upwards in succession to the first curtain C1. In this shutter speed control means, the delay between release of the first and second curtains is evidently dependent on the distance the first curtain travels before the pin 25 is brought into contact with and pivots the trigger lever 23, and this in turn is dependent on the position to which the trigger lever 23 is set by the adjustment lever 21.

The abovedescribed conventional shutter speed control means is effective in accurately varying shutter speeds, and also has the advantage for a photographer that different speeds may be selected by a simple action. However, the described means, in common with other conventional speed control means, has the disadvantage that a large number of parts is required, and construction is complex, with the result that accurate design and assembly of parts is made difficult, and the control means is accordingly more expensive, and difficult of maintenance.

It is accordingly an object of the present invention to provide an improved shutter speed control means.

It is a further object of the invention to provide a shutter speed control means having a minimum of parts.

It is another object of the invention to provide a shutter speed control means that is simple and economical in construction.

In accomplishing these and other objects, there is provided, according to the present invention, a shutter speed control means wherein, when a photograph is being taken, after a first curtain has moved a certain distance, a retention means, which normally engages and retains a second curtain, is moved out of engagement with the second curtain by a release lever, which has a lower rounded end portion in spring attachment to the retention means, is pivotally mounted on a pin fixedly attached to a lower portion of a setting arm, and is actuated by a pin fixedly attached to the first curtain. The setting arm is pivotally mounted on a screw at the lower end thereof, whereby movement of the setting arm causes the release lever to move along an arc centering on the pivot screw of the setting arm, the lower end of the release lever being maintained in the same relationship to the second curtain retention means, and the upper portion being moved closer or further away from the first curtain in an initial position, whereby the first curtain must travel a shorter or greater distance before the second curtain is released.

A better understanding of the present invention may be had from the following description of one embodiment thereof, when read in conjunction with the attached drawings, in which;

FIG. 1 is a front view of a conventional shutter speed control means;

FIG. 2 is a perspective view of essential parts in a shutter speed control means according to one embodiment of the present invention;

FIG. 3 is a front view of the means of FIG. 2 in an assembled condition.

Before proceeding with the description, it is to be noted that in FIGS. 2 and 3 like parts are indicated by like reference numerals. Also, for the purpose of the description, terms such as forward, rear, upper, or lower are to be taken as being in reference to a camera employing the shutter speed control means of the invention.

In FIG. 2, there is shown a first curtain 4 and a second curtain 5 of known construction comprising a curtain plate and a pair of side supports, respectively, each of which is pivotally mounted by a pin 1a provided on a wall 1 and may be swung upwards or downwards around the pin 1a in front of a film to be exposed in a known manner. The first curtain 4 and second curtain 5 are mounted and contained in a housing, of which only one wall 1 is shown with ideal lines in FIG. 2, and are moved upwards, to expose a film, and downwards, to a reset position, by a cocking and reset means of conventional type, not shown, provided, for example, on the opposite wall to wall 1 of the first and second curtain housing. The first curtain 4 may further include an upper side which constitutes a mirror surface, which may serve as a viewfinder, when the first and second curtains 4 and 5 are in the cocked position. The requirements of the shutter speed control means are that when a particular shot is taken, the second curtain 5 is released and moved upwards to chase the first curtain 4 in front of the film only after the first curtain has been released and has moved a particular distance upwards in front of the film. In the invention, release and resetting of the first curtain 4 is effected entirely by the cocking and reset means not shown. The second curtain 5 is reset together with the first curtain 4, and is released when a retainer 8 is actuated by a release lever 9.

Still in FIG. 2, the retainer 8 is provided at a lower part of the outer side of the wall 1, i.e., the side of the wall 1 that is opposite that of the first and second curtains 4 and 5, and comprises a pair of arms 8b and 8c, which lie generally flat with respect to the wall 1, and are at approximately right-angles to one another, the arm 8b being generally horizontally, and the arm 8c extending downwards, and a catch portion 8a, which is integrally formed at the end of the arm 8b. The catch portion 8a is generally V-shaped, extends stepwisely away from the plane of the arms 8b and 8c, and projects through an opening 1b, which is formed in the wall 1, and, permits a certain amount of upward or downward movement of the catch portion 8a. The retainer 8 is pivotally mounted on a shaft 7, which is fixedly attached to the wall 1, and is spring-loaded by a wire spring, or other suitable means 14, which exerts a constant force tending to turn the retainer 8 clockwise in drawings about the shaft 7. A limit to clockwise motion of the retainer 8 is reached when the catch portion 8a thereof is brought into contact with the lower side of the opening 1b in the wall 1. In this configuration, the catch portion 8a engages a catch projection 6 which is fixedly attached to and projects from a side support of the second curtain 5, when the second curtain 5 is in a cocked position, i.e., a lowermost and rearmost position, prior to a photograph being taken. Engagement of the catch projection 6 by the catch portion 8a prevents the second curtain 5 from moving. Anticlockwise rotation of the retainer 8, which is effected in a manner described below, disengages the catch portion 8a from the catch projection 6, thereby permitting the second curtain 5 to be moved upwards. The lower end of the retainer arm 8c is connected by a spring 11 to the lower end of a release lever 9, which is associated with a setting lever 2.

The setting lever 2 is provided on the outer side of the wall 1, forward of the retainer 8, and comprises a main upwardly extending portion 2a, and a lower, stepped portion formed by an approximately horizontal portion 2b, and a lowermost, vertical portion 2c. The setting lever 2 is pivotally mounted on a shaft 3, which passes through the lower end of the lever lowermost portion 2c, and is fixedly attached to the wall 1. At approximately the junction of the lever portions 2b and 2c, i.e., near the upper end of the lowermost portion 2c, a pin 10 is fixedly attached to the lever 2. The upper end of the setting lever main portion 2a is connected in a known manner to an external manually actuable adjustment means (not shown), whereby the setting lever 2 may be pivoted forwards or rearwards about the shaft 3. When the setting lever 2 is thus moved, the pin 10 attached thereto, of course, moves along an arc centering on the shaft 3. The setting lever 2 may be held fixedly in different positions by means not shown.

The release lever 9 comprises a long trigger arm 9a which is curved upwardly and rearwardly, and a rounded lower portion 19, one side of which contacts the forward side of the retainer arm 8c, and the lower end of which lies approximately over the pivot shaft 3 of the setting lever 2. The release lever 9 is pivotally mounted on the pin 10 attached to the setting lever 2, the pin 10 passing through an opening 9b formed in the approximate center of the lower rounded portion 19 of the release lever 9. As noted earlier, the lower end of the release lever 9 is connected by the spring 11 to the lower end of the retainer arm 8c, and the retainer 8 is normally held in a most clockwise position by the spring 14. Therefore, the lower end of the release lever 9 is normally held in the same position approximately over the setting lever pivot shaft 3. Also, as well as being pivotable about the pin 10 on the setting lever 2, the release lever 9 may be moved by the pin 10, when the setting lever 2 is moved forwards or rearwards. In this movement, since the lower end of the release lever 9 is held more or less stationary, the lever 9 is moved in an arc approximately centered on the setting lever pivot shaft 3. At the same time, since the portion of the release lever 9 in contact with the retainer 8 is the rounded portion 19 thereof, when the release lever 9 is moved by the setting lever 2, the release lever rounded portion 19 rides on the forward side of the retainer arm 8c, and the positional relationship of the lever 9 and retainer 8 remains constant, i.e., the retainer 8 is not moved when the position of the setting lever 2 is adjusted, and may still engage and retain the second curtain 5.

As shown most clearly in FIG. 3, the upper portion of the trigger arm 9a of the release lever 9 crosses an upwardly extending slot 13 which is formed in and extends completely through the wall 1, and which is curved to form an arc similar to that followed by a point on the first or second curtain 4 or 5 during motion of the first or second curtain 4 or 5. As is clear from FIG. 3, forward movement of the setting lever 2 causes the release lever 9 to move to a position in which the trigger arm 9a thereof crosses a higher part of the slot 13, and vice-versa. In other words, the setting lever 2 may be moved forwards or rearwards to set the release lever 9 to a higher or lower position relative to the slot 13. As noted earlier, the setting lever 2 is fixeable in different positions. Therefore, once set in any particular position, the release lever 9 remains in that position, but is pivotable about the pin 10 on the setting lever 2.

In FIG. 2, a pin 12 is fixedly attached to and extends from a side support of the first curtain 4. The pin 12 extends through and beyond the slot 13 to a point slightly beyond the outer side of the wall 1. When the first curtain 4 is in the cocked position, the pin 12 is brought to the lower end of the slot 13, and when the first curtain 4 swings upwards or downwards, the pin 12 is moved upwards or downwards along the slot 13.

Referring mainly to FIG. 3, prior to a photograph being taken, the first and second curtains 4 and 5 are in lowermost, rearmost positions, as indicated by the dotted line portions of FIG. 3, the pin 12 on the first curtain 4 is at the lower end of the slot 13, the retainer 8 engages the second curtain 5, and the trigger arm 9a of the release lever 9 crosses the slot 13 at a point determined by the position of the setting lever 2. This configuration remains unchanged, when the first and second curtains 4 and 5 are cocked, by means not shown. When a shutter release button or similar means is actuated, the first curtain 4 is released, and starts to move upwards in front of a film, but the second curtain 5 remains stationary because of engagement by the retainer 8. When the first curtain 5 has moved a certain distance upwards, the pin 12 attached thereto comes into contact with the trigger arm 9a of the release lever 9, and as the first curtain 4 continues to move upwards, the pin 12 moves the trigger arm 9a forward, whereby the release lever 9 is pivoted about the pin 10, and the lower end thereof pushes the lower end of the retainer arm 8c rearwards, whereby the retainer 8 is pivoted on the shaft 7 against the resilient force of the spring 14, and the catch portion 8a thereof is moved out of engagement with the second curtain 5, which is therefore released, and moves upwards, in succession to the first curtain 4. After reaching uppermost positions, the first and second curtains 4 and 5 are returned by means not shown to the lowermost positions indicated by the dotted line portions of FIG. 3 in a known manner, whereupon, pressure on the trigger arm 9a by the pin 12 being no longer applied, and the retainer 8 being rotated clockwise by the spring 14, the release lever 9 is returned by the spring 11 to the position in which it was originally set by the setting lever 2, while at the same time the catch projection 6 of the second curtain 5 is brought into engagement with the retainer catch portion 8a, which therefore again holds the second curtain 5 stationary, until the first curtain 4 is again released and has moved far enough for the pin 12 to have pivoted the release lever 9. Alteration of shutter speed is effected by moving the setting lever 2 to adjust the initial set position of the release lever 9, and so vary the distance the first curtain 4 must travel before the second curtain 5 is released. For example, for increased shutter speed, the setting lever 2 is moved rearwards, thereby bringing the release lever 9 to a setting in which it crosses the slot 13 a lower point, closer to the initial position of the pin 12 on the first curtain 4, with the result that the second curtain 5 is released after the first curtain 4 has moved only a short distance.

As is clear from the above description, the present invention provides a shutter speed control means that is extremely simple in design and requires very few parts, and so is easy to assemble and to maintain, and is of reduced cost.

It is evident that various modifications of the abovedescribed means are possible without any departure from the principles of the invention. For example, the lower portion 19 of the release lever 9 may comprise projection portion which projects through a suitable opening in the wall 1, and places limits on maximum rotation of the lever 9 by contact with opposite sides of this opening, or further connects to a pivotal means which is associated with a first and second curtain resetting means, and acts to return the lever 9 to its initial setting position when the first and second curtains 4 and 5 are reset. Also, the second curtain 5 may be held by pivotally mounted retainer 8 comprising two approximately horizontal arms, an upwardly extending arm, and a catch portion 8a formed by a flat plate which extends from the end of one of the horizontal arms through an opening 1b in the wall 1, and may engage a stud 6 attached to the lower portion of the second cutain 5, the retainer 8 being loaded by a spring 14 which tends to pivot the retainer 8 anticlockwise, to bring the catch portion 8 a into engagement with the stud 6, the end of a downwardly extending arm being spring-attached to a forward projection at the lower end of the release lever 9, and the downwardly extending arm being contactable by the rear side of the lower end of the release lever 9, whereby anticlockwise rotation of the release lever 9, caused by the pin 12, may pivot the retainer 8 clockwise and out of engagement with the second curtain 5. It is considered that these and other modifications are evident to those trained in the art. The scope of the invention should therefore be determined from the appended claims.

What is claimed is:

1. In a camera having first and second shutter curtains pivotally mounted within a housing, the improved shutter speed control means comprising:
a. a single-piece, shutter retaining member pivotally attached to said housing and engaging said second shutter curtain to retain said second shutter curtain in a first position,
b. a first lever pivotally attached to said housing at one end,
c. a second lever pivotally attached to said first lever, a first end of said second lever engaging said shutter retaining member,
d. a pin attached to said first shutter curtain passing through an arcuate slot in said housing, said pin being engageable with a second end of said second lever, and
e. spring means connecting said shutter retaining member and said first end of said second lever.

2. The improved shutter speed control of claim 1 wherein said shutter retaining member comprises a generally "L" shaped member pivotally attached to said housing having a first leg in contact with said first end of said second lever and a second leg projecting through an opening in said housing and engaging said second shutter curtain.

3. The improved shutter speed control of claim 2 wherein said spring means biases said second leg of said shutter retaining member into engagement with said second shutter curtain.

* * * * *